Nov. 29, 1938.　　　D. W. SHERMAN　　　2,138,679

FIFTH WHEEL

Filed Oct. 13, 1937　　　2 Sheets-Sheet 1

Donald W. Sherman
INVENTOR.

BY
ATTORNEY.

Nov. 29, 1938.  D. W. SHERMAN  2,138,679
FIFTH WHEEL
Filed Oct. 13, 1937  2 Sheets-Sheet 2

Donald W. Sherman
INVENTOR.

BY
ATTORNEY.

Patented Nov. 29, 1938

2,138,679

UNITED STATES PATENT OFFICE 2,138,679

FIFTH WHEEL

Donald W. Sherman, Shorewood, Wis., assignor to A. O. Smith Corporation, Milwaukee, Wis., a corporation of New York Application October 13, 1937, Serial No. 168,687

28 Claims. (Cl. 280—33.1)

This invention relates to a fifth wheel for tractor-trailer combinations.

The principal object of this invention is to provide a fifth wheel having the strength and durability of existing types, but having greatly reduced weight and being much less expensive to manufacture.

Another object is to provide a strong, durable wheel, suitable for use with different standard coupling devices, and fabricated from sheet metal so that its appearance is better than existing rough cast types.

Another object is to provide a simpler and less costly means for actuating the locking device which secures the king pin or other fastening element.

Another object is to provide a fifth wheel which can be attached to various widths of tractor frames without the use of special individual adapting means.

One embodiment of the invention is illustrated in the accompanying drawings in which the views are as follows.

Figure 1:
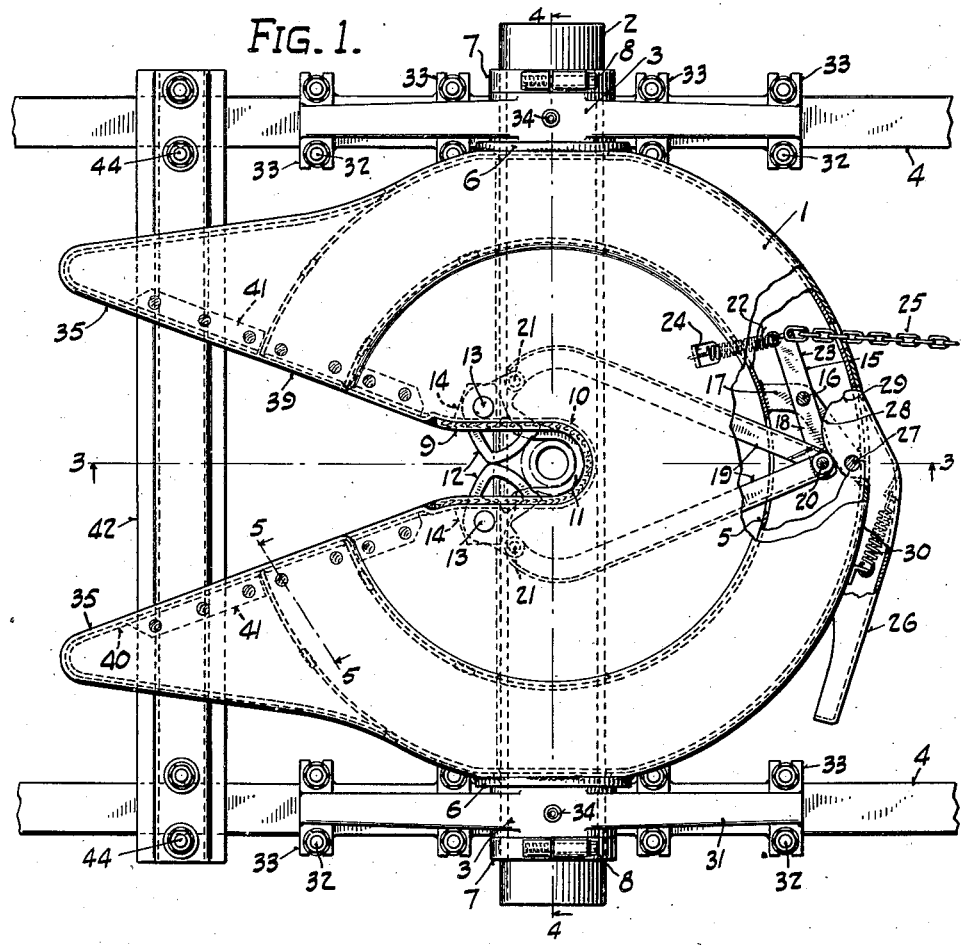
Figure 1 is a plan view of the fifth wheel mounted on the frame of a tractor.
Figure 2:
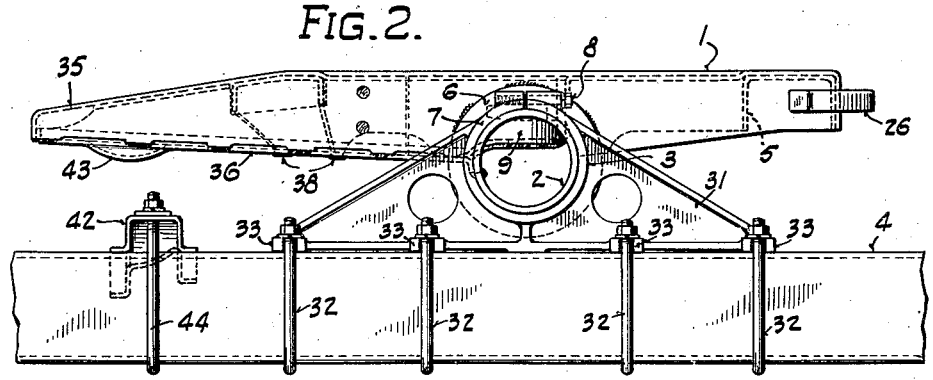
Fig. 2 is a side elevation of the fifth wheel as shown in Fig. 1.
Figure 3:
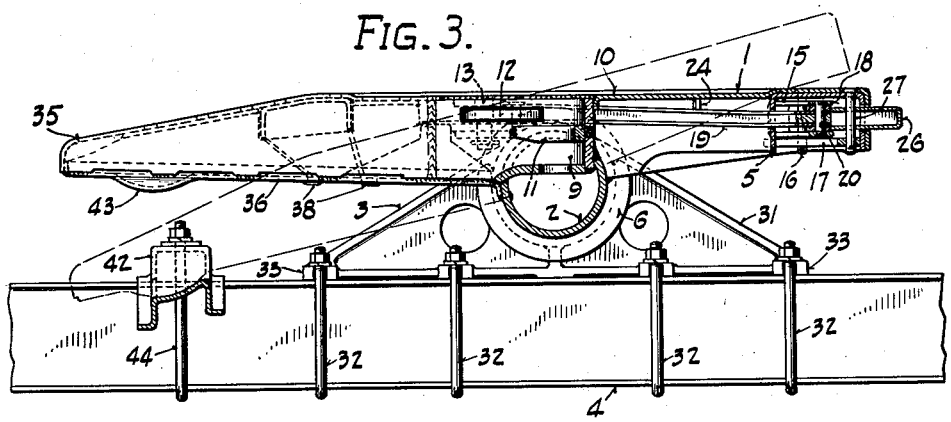
Fig. 3 is a central section taken on line 3—3 of Fig. 1.

The embodiment illustrated is constructed of sheet metal parts welded together, although it will be understood that many of the features of the invention may be employed in fifth wheels constructed of cast metal and the like.

The invention employs the characteristic three point support set forth in my previous application Serial No. 162,260, filed September 3, 1937 for Pressed steel fifth wheel. This application constitutes a continuation in part of said previous application.

The fifth wheel generally comprises a reenforced top bearing plate 1 of sheet metal, secured to a transverse member 2, which is pivotally mounted at its ends in bearing members 3 secured to the frame 4 of the tractor or truck.

The transverse member 2 is preferably of tubular sheet metal construction of sufficient strength to support the loads carried by the fifth wheel assembly. The top bearing plate 1 is united to the tubular member at three points, one at the center and two at the outer ends of the member.

A channel member 5, beneath the slightly raised outer periphery of the top plate 1 supports and reenforces said plate and has its vertical flanges cut out to fit over the tubular cross member 2 providing an abutting surface contact for welding. Adjacent each bearing a ring 6 is welded to the peripheral flange of the plate 1 and to the tube 2 to reenforce the connection between the plate and tube and also to serve as a thrust bearing.

On the outer side of each bearing 3, a clamp 7, locked by a bolt 8 retains the tubular cross member in fixed bearing contact and prevents side slippage and looseness. Any play which occurs due to wear can be removed by adjusting this clamp ring. Shims or washers may be used between the bearing and the ring 6 to adjust the fifth wheel assembly to frames of varying widths.

Figure 4:
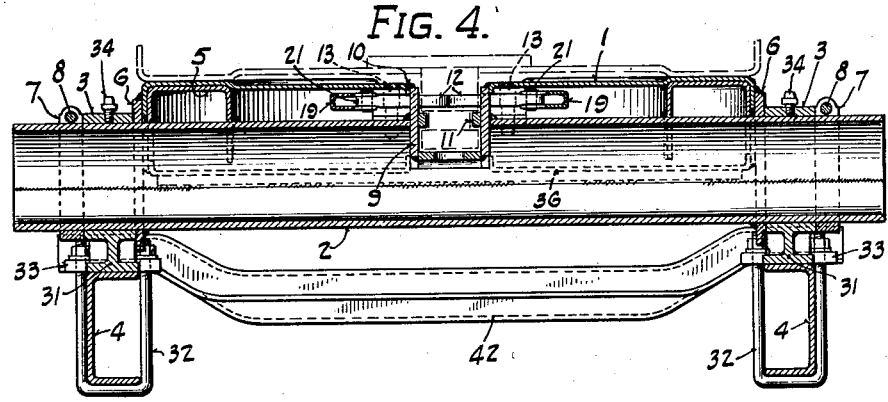
Fig. 4 is a transverse central section taken on line 4—4 of Fig. 1.
Figure 5:
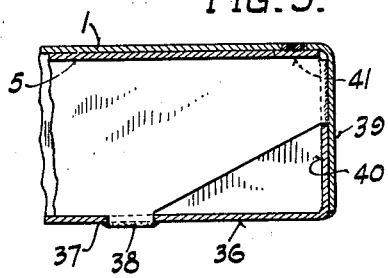
Fig. 5 is a transverse section taken on line 5—5 of Fig. 1.

At the center of the fifth wheel, the tubular member 2 is partly cut away in order that the connecting member 9, may be inserted into the opening and welded to the tubular member at their meeting edges. As illustrated in Figs. 1 and 4, the member 9 is U-shaped and is in reality an extension of the opening between the tails of the plate into which the king pin slides during coupling of the combination. The plate 1 has a flange 10, which fits snugly around the member 9 and provides an extended welding surface. A second U-shaped member 11 is fitted inside the member 9 with its open end facing the rear of the tractor. This member is designed to enter the recessed portion of a conventional king pin when the tractor and trailer plates are in engagement, and prevents the king pin from pulling out of operating position. The design permits the use of pressed steel parts. The king pin and trailer plate are illustrated by dotted lines, their construction being old and forming no part of this invention.

The member 9 has openings on opposite sides of the king pin passageway in which a pair of dogs 12 may move to lock the king pin against horizontal movement. These dogs are pivotal on vertical pins 13 supported in brackets 14 welded to the plate 1 and member 9.

The dogs 12 are operated by a two armed lever 15 pivotally mounted within the channel of member 5 on a vertical pin 16 extending between the web of the channel and a plate 17 secured to the lower ends of the flanges of the channel. One arm 18 of the lever is connected to the dogs 12 by links 19 secured to said arm by a pin 20 and to the dogs by pins 21. The dogs are held in closed position by a tension spring 22 attached to the arm 23 of the lever 15 and to a lug 24 depending from the plate 1. A chain or other connection 25 attached to the end of the arm 23 and extending to the front of the truck permits release of the lock from the cab or any other desired position.

An auxiliary control of the locking means is provided by the handle 26 attached to the fifth wheel by the pin 27 at a point on the longitudinal center line of the fifth wheel plate. This handle has a cam surface 28 contacting the ends of the links 19 at their juncture with the arm 18 of lever 15 and forces the pin 20 toward the center of the fifth wheel when the handle is moved into open position. The cam surface is notched at 29 to hold the dogs 12 locked in open position. Spring 30 attached to the handle 26 and the fifth wheel keep the handle in closed position except when the handle is opened far enough for the notch 29 to engage the ends of links 19. Necessary openings are provided in the depending flanges of the members 1 and 5 to permit free movement of the several lock operating members.

From the foregoing it is seen that the locking mechanism described will permit control by the driver while he is in the cab or in the vicinity of the fifth wheel itself. Prior to coupling, the dogs 12 may be in open or closed position, but preferably are closed, in which event the king pin will force them open at it passes into the slot in the tractor fifth wheel. The spring 22 will then automatically force the dogs shut and lock the king pin in position. To uncouple, the driver may either pull the chain 25, thus operating the lever 15 and opening the locking mechanism, or if he is on the ground at the rear of the tractor he may pull the handle 26, which forces the lock open. By pulling the handle far enough open, the dogs may be locked in open position, for the notch 29 on the cam surface will engage the ends of links 19 and prevent the handle from springing shut.

Each bearing 3 in which the fifth wheel is trunnioned is centrally located in a long base 31, which rests upon its respective side bar of the frame 4 and is securely held thereto by U bolts 32. For this purpose the lower flange of the base 31 is provided with several pairs of notched ears 33 engaged by the U bolts. The bearings may be provided with suitable grease fittings 34.

The construction of the plate is somewhat similar to that described in my co-pending application, before mentioned. It is substantially circular with flanged side walls and a central opening connected to a lateral slot through which the king pin is guided to locking position. It is extended in the rear to provide V shaped tails, which are inclined to afford a plane for the trailer to mount during coupling.

Certain novel features should be noted however, particularly with regard to the cross section through the tails 35. The outer part of the plate is reenforced by the channel member 5 which is U shaped with the closed section contacting the lower surface of plate 1. Two plates 36 close the bottom of the rear portion of the fifth wheel and are mortised at a number of points 37 into which tenons 38 of the flanges of the channel member 5 are fitted and welded. The plates are also welded to the depending flanges of the tails.

The ends of channel member 5 terminate at the V slot and engage and are welded to the depending flange 39 of plate 1 thus reenforcing the tail members at a point where considerable bumping is apt to occur. The plate 36 has a vertical flange 40 which engages the flange 39 along the V slot and is welded to it along its lower edge. The upper edge of flange 40 has a narrow inturned flange 41 engaging the underside of plate 1. The flange 41 and the edge portions of the web of channel 5 are plug welded to the plate 1.

Where the channel member 5 intersects the opening between the tails, the vertical flange 40 of the plate 36 is cut away a short distance from the top surface of the fifth wheel, to permit the vertical flanges of the channel to abut against the inner surface of the flange 39.

The detailed construction is set forth to bring out the preferred design to facilitate the fabrication process by making all welding operations convenient during the sequence of assembly operations.

The bottom plates 36 cover the whole underside of the tails and extend to the tubular cross member to which they are welded. The tube shown is of open seam construction, but by placing the seam at the point where the plates 36 are welded to the tube, the seam may be welded in the same operation, thus saving considerable time and labor. It is not necessary to weld the tubular seam along its whole length.

A cross member 42 is attached to the frame, rearwardly disposed of the cross member 2 to provide a seat for the tips of the fifth wheel extensions 35. This cross member is preferably a channel bar with a stamped upper surface complementary to the bosses 43 on the under side of the tips. The member 42 may be conveniently attached to the frame by U bolts 44, but when set across the top of the side bars of the frame in this manner, the central portion of the bar must generally be depressed to provide clearance for the trailer plate over the tips of the tractor fifth wheel. The U bolt connection avoids the necessity of drilling holes through the frame and permits the cross member 42 to be slid fore and aft to provide the proper positioning of the seats with respect to assemblies in which the fifth wheel may have higher or lower elevations.

Aside from the cross member 42, which supports the tails, no auxiliary cross members are required to support the plate, and in this respect the present invention is decidedly simpler than the type of fifth wheel now in commercial use. Present commercial wheels require the use of auxiliary cross members, spanning the tractor frame and providing a platform upon which the fifth wheel assembly rests. Although attempts have been made to mount the plate directly to shafts pivotal in bearings mounted on the frame, such efforts have failed because of a want of appreciation of the basic fact that the bearing mountings are subjected to a tremendous transverse torque around the frame side bars, which wears out the bearing surfaces and permits rocking of the mountings.

By utilizing a large tubular shaft or trunnion, the bearing surface is enlarged to the extent that the bearing mountings are in operating effect a part of the fifth wheel plate and shaft. The rigid side thrust ring and the clamp prevent wearing of the shaft and bearing contact and the relief afforded is such that theoretically the shaft will bend before rocking, caused by wearing, can occur. It is preferable however for optimum results that the clamp be maintained in close abutting relation with the ends of the bearings.

Having thus described my invention, what I claim as new and desire to secure by Letters Patent of the United States, is:

1. A fifth wheel for tractor-trailer combinations comprising a bearing plate for the tractor fabricated of welded sheet metal parts and disposed to engage a complementary bearing plate on the trailer, said tractor bearing plate having a large diameter tubular member rigidly attached thereto and providing trunnions disposed on either side thereof, and bearings of substantial width mounted on the side members of the tractor frame and encircling said trunnions to hold said tractor plate against lateral movement with respect to the side members of the tractor frame.

2. A fifth wheel for tractor-trailer combinations which comprises a horizontal bearing plate, a large transverse tubular member rigidly attached thereto, and aligned bearings attached to the frame of the tractor and encircling the tubular member adjacent its ends.

3. A sheet metal fifth wheel member for tractor-trailer combinations comprising a substantially circular plate having a central opening and a lateral slot extending therefrom to the rim for receiving a king pin, and a cross member rigidly connected to the plate at the center and outer edges of said plate, said cross member being pivotally mounted in fixed bearings attached to the frame of the tractor.

4. A sheet metal fifth wheel for tractor-trailer combinations comprising a substantially circular horizontal plate, a transverse member rigidly connected to said plate, said transverse member being provided with large trunnion members, trunnion bearings disposed around said trunnions and rigidly attached to the frame of the tractor, and a lateral thrust bearing on each side of the plate to prevent lateral movement thereof.

5. A sheet metal fifth wheel member comprising a substantially circular plate having a central opening and a lateral slot extending therefrom to the rim for receiving a king pin, and a cross member rigidly connected to the plate and pivotally mounted in aligned bearings disposed outside the rim of said plate, the cross member being retained in said bearings by clamping rings tightly clamped to the ends of said cross member.

6. A fifth wheel member for tractor-trailer combinations comprising a substantially circular sheet metal plate having a central opening and a lateral slot extending therefrom for receiving a king pin, a U shaped sheet metal plate confining the central opening and united to a cross member pivotally mounted on the tractor frame.

7. A fifth wheel for tractor-trailer combinations comprising a substantially circular bearing member mounted for tilting on the tractor and disposed to engage a complementary bearing member on the trailer, a housing attached to a cross member on the tractor frame having locking means projecting through openings therein for receiving and holding a king pin, said housing being disposed centrally of said bearing member, and means for guiding the king pin into said housing during coupling.

8. A fifth wheel member for tractor-trailer combinations comprising a substantially circular sheet metal plate pivotal on a horizontal transverse axis and having a central opening and a lateral slot extending therefrom for receiving a king pin, and a U shaped sheet metal member at the center of said plate and united to a cross member mounted on the tractor frame, said U shaped member having a rim on the inner surface thereof defining a recess in the member for confining the head of the king pin to prevent vertical motion between the king pin and fifth wheel member.

9. A fifth wheel for tractor-trailer combinations comprising a substantially circular sheet metal plate having a central opening and a lateral slot extending therefrom for receiving a king pin, and a U shaped sheet metal stamping confining the central opening and united to a cross member pivotally mounted on the tractor frame, said U shaped stamping having a rim on the inner surface thereof for engagement with a recess in the king pin to prevent vertical motion between the king pin and the fifth wheel member.

10. A fifth wheel for tractor-trailer combinations which comprises a bearing plate supported on a tractor frame and tiltable upon a transverse horizontal axis, said plate having tails extending toward the rear of the tractor, and a seat for the tips of said tails consisting of a cross member adjustably attached to the side rails of the frame and having an upper curved surface complementary to a similar lower surface of said tips over a curved surface of substantial area and disposed to provide full bearing contact throughout the range of adjustments of the cross member.

11. A fifth wheel member for tractor-trailer combinations comprising a fifth wheel bearing plate having a central opening and lateral slot extending rearwardly therefrom for receiving a king pin, a transverse member supporting said plate, a U shaped stamping joined to the transverse member and to the center of the plate, and locking means projecting through an opening in said stamping to close the opening in said plate and lock the king pin therein.

12. A fifth wheel for tractor-trailer combinations comprising a tractor plate having a central opening and a laterally disposed slot for receiving a king pin during the coupling operation, a transverse member supporting said plate, a U shaped member confining said opening and joined to the transverse member, locking means projecting through an opening in said U shaped member to close said opening, links connected to said locking means and to each other at a movable point, and a plurality of independent operating means contacting at said point for moving the same and operating the locking means.

13. A fifth wheel for tractor-trailer combinations embodying a plate with an opening therein extending from the center thereof to the outer edges of the plate, through which a king pin may be guided to said center, locking means for retaining the king pin at the center, links for operating said locking means meeting at a movable point, and a plurality of independent operating means contacting said links at said point for moving the same and operating the locking means.

14. A fifth wheel for tractor-trailer combinations embodying a plate with an opening therein extending from the center thereof to the outer edges of the plate, through which a king pin may be guided to said center, locking means for retaining the king pin at the center, links for operating said locking means meeting at a movable point, and a cam pivotably attached to said plate and contacting said links at said point to move the same and operate said locking means.

15. A fifth wheel for tractor-trailer combinations embodying a plate with an opening therein extending from the center thereof to the outer edges of the plate, through which a king pin may be guided to said center, locking means for retaining the king pin at the center, links for operating said locking means meeting at a movable point, and a cam pivotally attached to said plate for moving said point to operate said locking means, said cam being provided with a notch to engage said point and maintain said locking means in a fixed position.

16. A fifth wheel for tractor-trailer combinations embodying a plate with an opening therein extending from the center thereof to the outer edges of the plate, through which a king pin may be guided to said center, locking means for retaining the king pin at the center, links for operating said locking means meeting at a movable point, and a cam for moving said point to operate said locking means, said cam being operated by a handle pivotally attached to said fifth wheel plate and normally retained in position to keep the point of contact between the cam and said movable point at one extremity of the operable cam surface, the other extremity of said surface being indented to prevent the handle from moving the cam surface toward its normal position and to maintain it in fixed position.

17. In a fifth wheel tractor-trailer combination, a tractor plate having a central opening and a slot extending laterally therefrom for receiving a king pin, a locking means comprising two dogs pivotally attached to said plate and disposed to close said slot to secure the king pin in place in said central opening, a link extending forwardly from the free end of each of said dogs, said links having their forward ends pivoted together at a movable point and means at said common pivot point of said links for controlling the operation of said dogs.

18. In a fifth wheel for tractor-trailer combinations a tractor plate having an opening therein for receiving a king pin, normally closed locking means for locking the king pin in said opening, means manually operable from adjacent said fifth wheel for opening said locking means and for holding said means in open position, and means operable from within the cab of the tractor for releasing said first named means and for opening and closing said locking means independently from said first named operating means.

19. A sheet metal fifth wheel for tractor-trailer combinations comprising a flanged horizontal bearing plate having a central opening and a pair of tails extending from the center on either side of said opening, a transverse member supporting said plate, and a pair of sheet metal plates disposed between the flanges of the bearing plate and extending from the tails to the transverse member.

20. A sheet metal fifth wheel comprising a flanged horizontal bearing plate having a central opening and a pair of tails extending rearwardly from the center on either side of said opening, a tubular member supporting said plate, a sheet metal plate disposed between the flanges of the bearing plate and extending from the tails to the tubular member, said tubular member having a seam adjacent the contacting end of said sheet metal plate and weld metal closing said seam and bonding said last named plate to the tubular member.

21. A sheet metal fifth wheel for tractor-trailer combinations comprising a substantially circular horizontal sheet metal plate having a central opening and a laterally disposed slot extending therefrom, said plate being flanged and reenforced at its outer periphery by a channel member disposed within said flange and abutting against the flanges confining said slot, and a sheet metal plate disposed between the flanges of said plate and beneath said channel member, said last named plate having mortises for engaging depending tenons on the vertical flanges of said channel member and being welded to said flanges.

22. A sheet metal fifth wheel which comprises a substantially circular bearing plate having a central opening and a lateral slot confined by a vertical flange depending from said plate, a substantially circular inverted, U-shaped channel member reenforcing said plate at its outer periphery and abutting the flanges of said plate confining said slot, and a bottom plate disposed adjacent the flange of said bearing plate and having a vertical flange to reenforce the flange on said bearing plate, said last named flange being partly cut away to permit the flanges of said channel member to abut against the flange of said bearing plate.

23. A sheet metal fifth wheel member comprising a horizontal bearing plate having a central opening and a lateral slot extending rearwardly therefrom, a U shaped stamping confining said opening and welded to said plate, and a transverse tubular member disposed beneath said plate and cut away to permit said stamping to extend into said tubular member and provide an extended contacting surface for welding the stamping to the tubular member.

24. In a sheet metal fifth wheel for tractor-trailer combinations, a horizontal bearing plate having a central opening and a lateral slot extending rearwardly therefrom, a transverse member disposed beneath said plate and a U shaped stamping confining said opening and attached to the transverse member and to the bearing plate, said bearing plate having a depending flange adjacent said U shaped stamping enclosing the same and providing an extended welding surface between said plate and said stamping.

25. In a sheet metal fifth wheel for tractor-trailer combinations, a substantially circular sheet metal bearing plate having a depending flange at the outer periphery thereof, an inverted U shaped channel member disposed beneath said plate and within said flange, and a tubular cross member welded to the bearing plate, the flange on said bearing plate and the flanges on said channel member being cut out to provide an opening for said tubular member and an extended contacting surface for welding said flanges to said tubular member.

26. A fifth wheel for tractor-trailer combinations comprising a pressed steel bearing plate for the tractor disposed to engage a complementary bearing plate on the trailer, a large transverse tubular member disposed beneath said bearing plate and rigidly attached thereto, and aligned bearings attached to the frame of the tractor and encircling said tubular member adjacent its ends.

27. A fifth wheel for tractor-trailer combinations comprising a pressed steel fifth wheel bearing plate for the tractor having a central opening and a lateral slot extending therefrom to the rim of the plate for engaging a king pin, a king pin engaging element at the center of said plate and attached thereto and a large diameter tubular member attached to the king pin engaging element and the bearing plate and disposed for rotation in bearings mounted on the tractor frame.

28. A fifth wheel member comprising a substantially circular pressed steel bearing plate having a central opening and a lateral slot extending therefrom to the rim for receiving a king pin, a transverse tubular member supporting said plate and on which said plate may be tilted, a housing attached to said member and said plate having a locking mechanism mounted thereon for engaging a king pin, and means for guiding the king pin into said housing during coupling.

DONALD W. SHERMAN.